United States Patent [19]

Babitzka et al.

[11] Patent Number: 4,915,350

[45] Date of Patent: Apr. 10, 1990

[54] ELECTROMAGNETICALLY ACTUATABLE VALVE

[75] Inventors: Rudolf Babitzka, Kirchberg-Neuhof; Ferdinand Reiter, Markgroeningen, both of Fed. Rep. of Germany

[73] Assignee: Robert Bosch GmbH, Stuttgart, Fed. Rep. of Germany

[21] Appl. No.: 397,801

[22] Filed: Aug. 23, 1989

[30] Foreign Application Priority Data

Sep. 14, 1988 [DE] Fed. Rep. of Germany ....... 3831196

[51] Int. Cl.[4] ........................ F16K 31/06; B05B 1/32; F02M 51/06

[52] U.S. Cl. .......................... 251/129.15; 251/129.21; 239/585

[58] Field of Search ...................... 251/129.15, 129.21; 239/585

[56] References Cited

U.S. PATENT DOCUMENTS 3,262,027 7/1966 Zaleske et al. ............ 251/129.15 X
4,403,741 9/1983 Moriya et al. ............ 251/129.15 X
4,564,145 1/1986 Takada et al. ..................... 239/585
4,597,558 7/1986 Hafner et al. ............. 251/129.15 X
4,783,009 11/1988 Coates ........................... 239/585 X

*Primary Examiner*—Arnold Rosenthal
*Attorney, Agent, or Firm*—Edwin E. Greigg

[57] ABSTRACT

In known electromagnetically actuatable valves, a connecting tube connected to the armature has a valve closing element secured to its other end. The connecting tube has fuel flowing through it, which can exit again in the vicinity of the valve closing element via radially extending openings. To make such tubes additional work steps are required. There is proposed a novel connecting tube intended to assure easy manufacture and simple assembly with minimum weight and maximum stability. The novel connecting tube is provided with a slit extending from one end to the other, which provides the connecting tube with resilient elasticity and provides a large-area hydraulic cross section. The manufacture of the connecting tube can be accomplished easily by rolling of a sheet-metal blank. The embodiment of the connecting tube is suitable for electromagnetically actuatable valves of all kinds.

9 Claims, 2 Drawing Sheets

ELECTROMAGNETICALLY ACTUATABLE VALVE

BACKGROUND OF THE INVENTION

The invention is directed to improvements in electromagnetically actuatable valves. An electromagnetically actuatable valve has already been proposed in which a connecting tube is provided between an armature and a ball serving as a valve closing element; however, the diameter of the connecting tube must be manufactured relatively precisely so that the armature can be slipped onto it and secured there. Furthermore, in the vicinity of the ball, a plurality of flow openings radially penetrating the wall of the connecting tube are provided, through which fuel flowing in the interior from the armature can reach the valve seat. Additional operations are required to manufacture these flow openings, complicating an already intricate and expensive manufacturing process.

OBJECT AND SUMMARY OF THE INVENTION

It is an object of the invention to provide an electromagnetically actuatable valve having the advantage over the prior art of ease of manufacture and simple assembly of the connecting tube to relatively wide tolerances, minimal weight and maximum stability, as well as providing a hydraulic flow cross section of large area. The slit extending over its entire length makes the connecting tube resiliently elastic, which facilitates connecting the armature and the valve closing element. The connecting tube may be produced not only by using a thin-walled tube available on the market, by producing the slit by sawing, milling or the like, but also by using a rectangular metal sheet, in particular, which is rolled or bent into a tube in such a way that the slit is formed between the longitudinally extending end faces of the sheet. The slit in the connecting tube, made of nonmagnetic material, also prevents the undesirable development of turbulence.

It is another object of the invention and particularly advantageous to manufacture the connecting tube from sheet metal, for instance by rolling or bending rectangular sheet metal blanks in such a way that the connecting tube provided with a longitudinal slit is the result.

Still another object and advantageous feature of the invention is to provide an inclined slit in the connecting tube, which can for instance be done by using a sheet metal blank in the form of a parallelogram to make the connecting tube.

It is a further object of the invention and quite advantageous to provide the wall of the connecting tube with a plurality of flow openings penetrating it, to prevent hydraulic conditions in the valve from undesirably influencing the ejected fuel.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
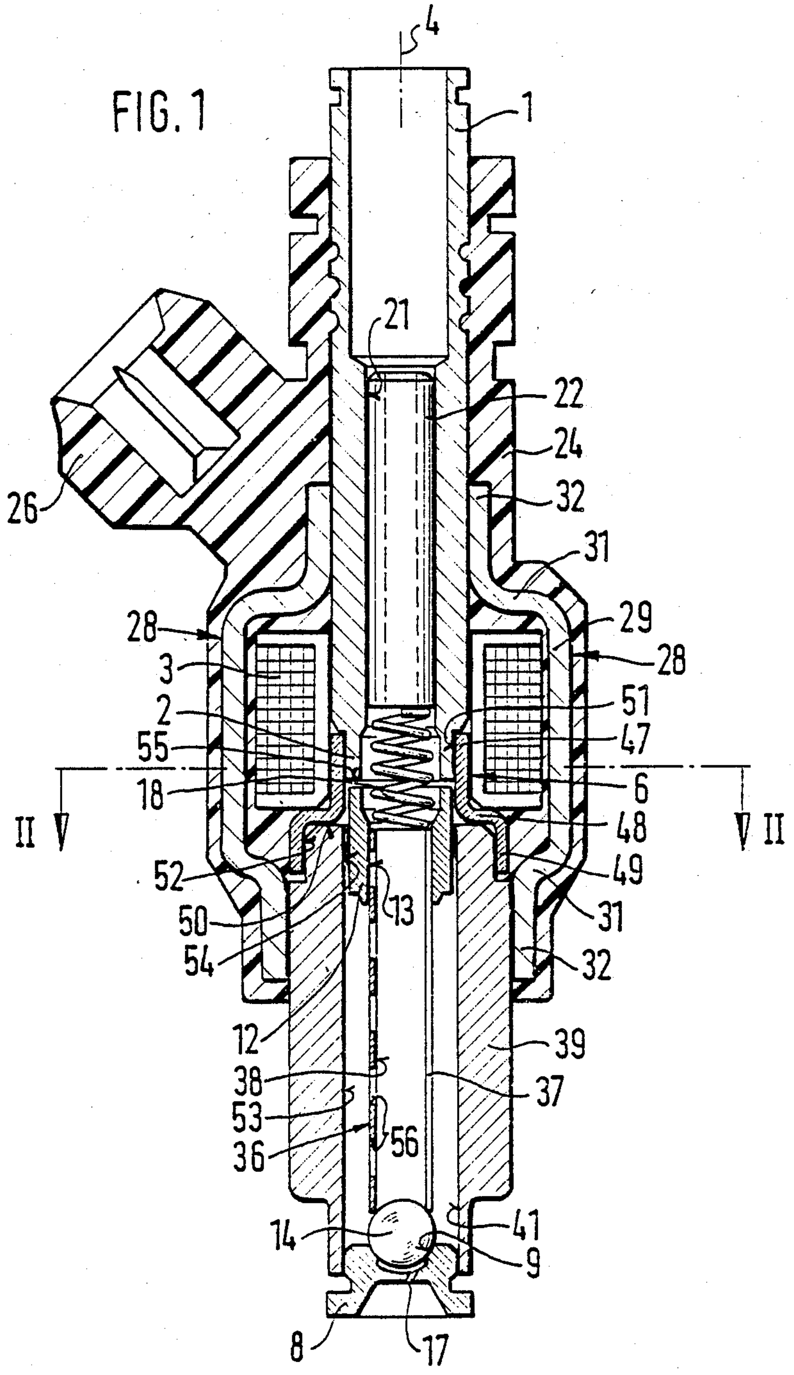
FIG. 1 shows a first exemplary embodiment of a valve equipped according to the invention.

The electromagnetically actuatable valve 1 shown as an example in FIG. 1, in the form of a fuel injection valve as a component of a fuel injection system in a mixture-compressing internal combustion engine having externally supplied ignition has a tubular metal connection pipe 1 of ferromagnetic material, on the lower core end 2 of which a magnet coil 3 is disposed. The connection pipe 1 thus serves simultaneously as a core. Adjoining the core end 2 of the connection pipe 1, an intermediate part 6 is joined tightly, for instance by soldering or welding, to the connection pipe 1 concentrically with the longitudinal axis 4 of the valve. The intermediate part 6 is made from nonmagnetic sheet metal, which is deep drawn and has, extending coaxially with the longitudinal axis 4 of the valve, a first connection section 47, with which it completely surrounds the core end 2 and is tightly joined to it. A collar 48 extending radially outward from the first connecting section 47 leads to a second connecting section 49 of the intermediate part 6, which extends coaxially to the longitudinal valve axis 4 and in the axial direction protrudes partway past a connecting part 39 to which it is tightly joined, for instance by soldering or welding. The diameter of the second connecting section 49 is thus greater than that of the first connecting section 47, so that in the assembled state the tubular connecting part 39 rests with one end face 50 on the collar 48. To make a small valve size possible, the first connecting section 47 surrounds a retaining step 51 of the core end 2, this step having a smaller diameter than the connecting pipe 1, and the second connecting section 49 surrounds a retaining step 42, likewise embodied with a diameter smaller than in the adjoining region, of the connecting part 39.

Remote from the end face 50, the connecting part 39, which is made of ferromagnetic material, has a retaining bore 41, into which a valve seat body 8 is tightly inserted, for instance by a screw means, welding or soldering. The retaining bore 41 merges with a transition bore 53, which is adjoined in the vicinity of the end face 50 by a slide bore 54, into which a cylindrical armature 12 protrudes and by which the armature 12 is guided. Thus the retaining bore 41 and the slide bore 54 can be manufactured in one chuck during manufacture, resulting in bores very accurately aligned with one another. The armature 12 is guided neither by the intermediate part 6 nor by the transition bore 53 of the connecting part 39. The axial length of the guide bore 54 is short in comparison with the axial length of the armature 12, amounting to about 1/15 the length of the armature. An annular, narrow stop collar 55, the width of which is about 0.2 mm, is embodied on the core end 2 of the connection pipe 1, oriented toward the armature 12.

Remote from the connection pipe 1, the metal valve seat body 8 has a fixed valve seat 9 oriented toward the core end 2 of the connection pipe 1. The assembly of connection pipe 1, intermediate part 6, connecting part 39 and valve seat body 8 forms a rigid metal unit. One end of a thin-walled, round connecting tube 36 is inserted into a stepped fastening opening 13 of the armature 12 and connected to the armature, and the other end of tube 36, oriented toward the valve seat 9, is connected to a valve closing element 14, which may for instance take the form of a ball, a hemisphere or some other shape.

Remote from the valve closing element 14, a restoring spring 18, which is for instance supported at one end on an end face of the connecting tube 36, protrudes into the stepped fastening opening 13 that penetrates the armature 12. The other end of the restoring spring 18 protrudes into a flow bore 21 of the connection pipe 1, where it rests on a tubular adjusting bushing 22, which is screwed or pressed into the flow bore 21, for instance, in order to adjust the spring tension. At least part of the connection pipe 1 and the entire length of the magnet coil 3 are surrounded by a plastic jacet 24, which also surrounds the intermediate part 6 and at least part of the connecting tube 36. The plastic jacket 24 can be attained by casting or spray coating with plastic. An electrical connection plug 26 is formed onto the plastic jacket 24 at the same time, by way of which the electrical contacting of the magnet coil 3, and hence its excitation, takes place.

The magnet coil 3 is surrounded by at least one conduction element 28, serving as a ferromagnetic element to guide the magnetic field lines; this element is made of ferromagnetic material and extends in the axial direction over the entire length of the magnet coil 3, at least partly surrounding the magnet coil 3 in the circumferential direction as well.

Figure 2:
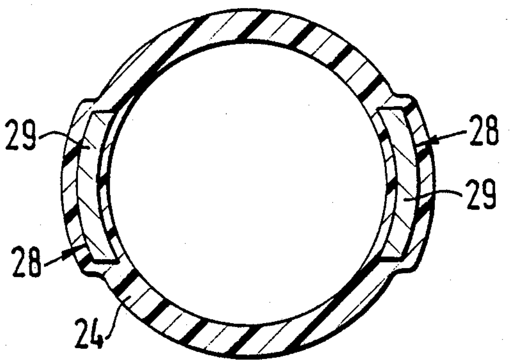
FIG. 2 is a section taken along the line II—II of FIG. 1.

The conduction element 28 is embodied in the form of a hoop, with a curved medial portion 29 adapted to the contour of the magnet coil and only partly surrounding the magnet coil 3 circumferentially, and the medial portion has end portions 31 that extend radially inward and partly surround the connection pipe 1 on the one hand and the connecting part 39 on the other, each end portion 31 merging with an axially extending shell end 32. In FIGS. 1 and 2, a valve having two conduction elements 28 is shown.

In the tube wall of the connecting tube 36, there is a slit 37 radially penetrating the tube wall and extending over the entire length of the connecting tube 36, and through this slit, the fuel flowing from the armature 12 into an inner conduit 38 of the connecting tube 36 can flow into the transition bore 53 and from there to the valve seat 9, downstream of which in the valve seat body 8 there is at least one ejection opening 17, through which the fuel is injected into an intake tube or a cylinder of an internal combustion engine.

In the exemplary embodiment of FIG. 1, two conduction elements 28 are provided, which as shown in FIG. 2 may be disposed in opposed relation to one another. For reasons of space, it may also be suitable to have the electrical connection plug 26 extend in a plane that is rotated by 90°, or in other words is perpendicular to a plane through the conduction elements 28.

Figure 3:
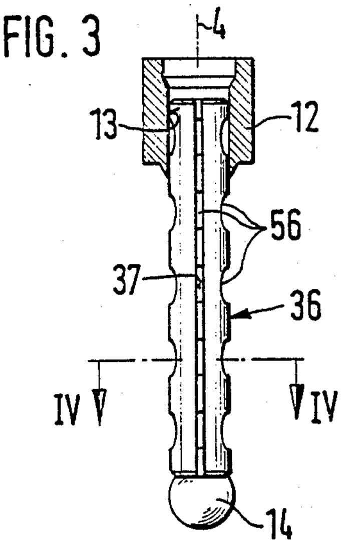
FIG. 3 shows a connecting tube as in FIG. 1 with an armature and a valve closing element.
Figure 4:
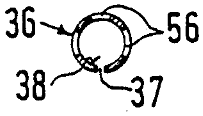
FIG. 4 is a section taken along the line IV—IV of FIG. 3.

In FIGS. 3 and 4, the connecting tube 36 already shown in FIG. 1 is shown by itself, with the armature 12 fastened to one end and the valve closing element 14 connected to its other end. The connection between the connecting tube 36 and the armature 12 and valve closing element 14 is advantageously made by welding or soldering. In this exemplary embodiment, the slit 37 penetrating the tube wall from the inner conduit 38 toward the outside extends in a plane that passes through the longitudinal valve axis 4, from one end to the other of, the connecting tube 36. The slit 37 makes a large-area hydraulic flow cross section available, by way of which the fuel can very rapidly flow out of the inner conduit 38 into the transition bore 53 and thus to the valve seat 9. The thin-walled connecting tube 36 assures maximum stability with minimum weight.

A connecting tube 36 according to the invention can be manufactured by cutting off suitable lengths of a tube available on the market to make individual connecting tubes and then making the slit 37 longitudinally from one end to the other, for instance by milling, sawing, cutting or the like. The slit 37 may also be made in such a way that it is inclined relative to the longitudinal valve axis 4, as shown in the exemplary embodiment of FIG. 6. The inclined slit 37 makes uniform distribution of the outflowing fuel into the transition bore 53 possible.

Figure 5:
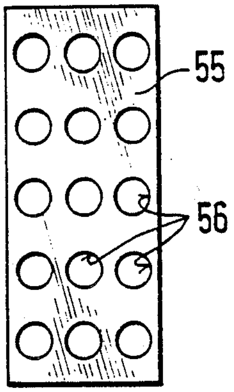
FIG. 5 shows a sheet-metal blank provided with flow openings for forming a connecting tube.

However, the manufacture of the connecting tube 36 may also be accomplished by stamping it from rectangular sheet-metal blanks 55 having the thickness of the tube wall, one such blank being shown in FIG. 5, two longer sides of the blank being approximately equal in length to the length of the connecting tube 36 to be produced, and the other two sides being approximately equivalent in length to the circumference of the connecting tube to be produced. Then, each sheet-metal blank is rolled or formed into the shape of the connecting tube 36 desired, for instance by forming it around a mandrel. In this operation, the two longitudinally extending end faces of the blank forming the connecting tube 36 form the slit 37, facing one another in opposed spaced relation. To prevent the fuel possibly flowing asymmetrically to the valve seat 9 from undesirably influencing the shape of the stream of fuel ejected from the ejection opening 17, it is advantageous to provide the connecting tube 36 with a plurality of flow openings 56, which are distributed approximately symmetrically in an array, including in the axial direction, and penetrate the tube wall of the connecting tube 36. The sheet-metal blank 55 shown in FIG. 5 has as an example three flow openings 56 extending horizontally and five such openings extending vertically. Either the flow openings 56 are obtained by making the sheet-metal blanks 55 from already-perforate sheet metal, or the flow openings 56 are produced simultaneously with the making of the sheet-metal blanks 55. The flow openings 56 may extend such that the fuel emerging into the transition bore 53 exits radially, or a swirl is imposed upon it. The flow openings 56 may also extend in inclined fashion toward the valve seat 9.

Figure 6:
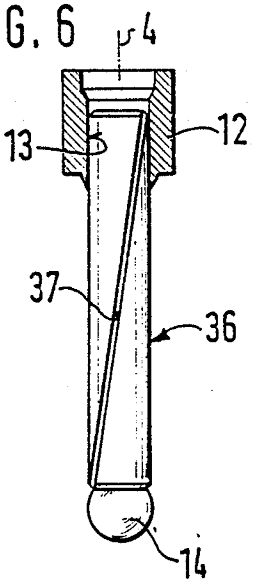
FIG. 6 shows a further exemplary embodiment of a connecting tube with an armature and a valve closing element.

To form a suitable slit 37 in the exemplary embodiment of FIG. 6, a sheet-metal blank in the form of a parallelogram may be selected.

The manufacture of the connecting tube 36 from a sheet-metal blank is a particularly easy and simple kind of manufacture, which also makes it possible to use many different materials. Providing the slit 37 in the connecting tube 36 makes it resiliently elastic, so that for the fastening opening 13 of the armature 12, the connecting tube 36 itself and the valve closing element 14 as well, relatively wide tolerances can be selected, because the resilient yielding property it possesses makes it possible to insert the connecting tube 36 by its end with tension into the fastening opening 13 of the armature 12, which makes for easier assembly as well.

The foregoing relates to preferred exemplary embodiments of the invention, it being understood that other variants and embodiments thereof are possible within the scope of the invention, the latter being defined by the appended claims.

What is claimed and desired to be secured by Letters Patent of the United States is:

1. An electromagnetically actuatable fuel injection valve for fuel injection systems of mixture-compressing internal combustion engines having externally supplied ignition, comprising a first housing element having means defining a core on one end around which a magnet coil is disposed, an armature adjacent an end of the core, a second housing element connected to said first housing element, a connecting tube (36) having a first and a second end, said connecting tube provided with a tube wall disposed concentrically with a longitudinal axis of said valve, said connecting tube being disposed within said second housing element, said connecting tube being joined at a first end to the armature and at a second end to a valve closing element, a valve seat body supported within an end of said second housing element, a valve seat on said valve seat body, said valve closing element arranged to cooperate with said valve seat, said connecting tube having a longitudinal slit (37) penetrating the tube wall along its entire length.

2. A valve as defined by claim 1, further wherein the slit (37) in the connecting tube (36) extends in a plane passing through the longitudinal axis (4) of said valve.

3. A valve as defined by claim 1, further wherein the slit (37) in the connecting tube (36) extends in an inclined fashion with respect to the longitudinal axis (4) of said valve.

4. A valve as defined by claim 2, further wherein the connecting tube (36) is embodied of sheet metal.

5. A valve as defined by claim 3, further wherein the connecting tube (36) is embodied of sheet metal.

6. A valve as defined by claim 4, further wherein the tube wall of the connecting tube (36) is provided with a plurality of flow openings (56) penetrating it.

7. A valve as defined by claim 5, further wherein the tube wall of the connecting tube (36) is provided with a plurality of flow openings (56) penetrating it.

8. A valve as defined by claim 1, further wherein the armature (12) is embodied cylindrically and is provided with means defining a fastening opening (13), into which said first end of the connecting tube (36) protrudes.

9. A valve as defined by claim 1, further wherein the valve closing element (14) is spherical and is connected to the second other end of the connecting tube (36).

* * * * *